United States Patent [19]

Betz

[11] Patent Number: 4,941,952
[45] Date of Patent: Jul. 17, 1990

[54] PROCESS FOR THE TREATMENT OF WASTE MATERIAL

[75] Inventor: Monika Betz, Ketsch, Fed. Rep. of Germany

[73] Assignee: Asea Brown Boveri Aktiengesellschaft, Mannheim, Fed. Rep. of Germany

[21] Appl. No.: 355,405

[22] Filed: May 22, 1989

[30] Foreign Application Priority Data

May 21, 1988 [DE] Fed. Rep. of Germany ....... 3817437

[51] Int. Cl.$^5$ .............................................. C10B 53/00
[52] U.S. Cl. .......................................... 201/1; 201/2.5;
201/25; 201/45; 423/DIG. 20; 436/55
[58] Field of Search ......................... 201/1, 2.5, 25, 45;
423/230, DIG. 5, 244, 240; 436/55

[56] References Cited

U.S. PATENT DOCUMENTS 4,303,477 12/1981 Schmidt et al. ....................... 201/2.5
4,431,618 2/1984 Boward et al. ......................... 436/55

Primary Examiner—Joye L. Woodard
Attorney, Agent, or Firm—Herbert L. Lerner; Laurence A. Greenberg

[57] ABSTRACT

In the treatment of hydrocarbon-containing waste material, in particular plastic-containing waste material, by pyrolysis, gases containing hydrogen halide compounds which are formed are neutralized by the addition of basic additive material. Since the reacted additive material increases the pyrolysis residue, it is desirable to monitor the controlled feed of the additive material. Therefore, the pH value is measured in the low-boiling pyrolysis oil, which additionally also contains water vapor condensate, and the controlled feed of the additive material is automatically varied as a function of the measurement. The result is that the pollutants are largely, or at least adequately, bound with low consumption of additive material.

12 Claims, 2 Drawing Sheets

PROCESS FOR THE TREATMENT OF WASTE MATERIAL

BACKGROUND OF THE INVENTION

1. Field of the Invention

The invention relates to a process for the treatment of hydrocarbon-containing waste material, in particular plastic-containing waste material, which includes subjecting the waste material to pyrolysis with the addition of an additive material that binds acidic pollutants, feeding pyrolysis gas which is formed to at least one first precooling stage, and cooling the gas to a temperature below the condensation temperature of water vapor with the production of low-boiling pyrolysis oil in at least one second cooling stage downstream of the gas side the first precooling stage.

2. Description of the Related Art

The pyrolysis gas formed in the pyrolysis of hydrocarbon-containing waste material, in particular plastic wastes, contains hydrocarbons and, depending on the nature and composition of the waste material, more or less water vapor and a number of gaseous pollutants, namely: compounds of nitrogen, chlorine, sulphur and fluorine, and cyano compounds. Of these pollutants, especially the halogens chlorine and fluorine are extremely aggressive, so that metal parts subjected to the pyrolysis gases must be of a particularly corrosion-resistant and therefore expensive construction. In the cooling stages, where low-boiling pyrolysis oil is obtained by cooling of the pyrolysis gas to a temperature below the condensation temperature of water vapor, in most cases to 30 to 80° Celsius, under approximately ambient pressure, the water formed from the water vapor of the pyrolysis gas absorbs the above-mentioned pollutants, and in particular the halogens fluorine and chlorine in the form of their hydrogen compounds. As a result of this loading with pollutants, the water assumes the properties of an acid, so that the components coming into contact with this water must also be acid-resistant and are therefore correspondingly expensive. Furthermore, the disposal of this pollutant-laden water entails additional costs.

In order to reduce the formation of pollutants, it is therefore usual to introduce a basic, fine-grained additive material, preferably calcium carbonate, hydrated lime, calcium oxide, magnesium carbonate, magnesium oxide, dolomite or sodium hydroxide, as an individual material or as any desired mixture of these individual materials, into the pyrolysis reactor during the pyrolysis process, that is to say to carry out the pyrolysis in the presence of these materials. As a result, the acidic pollutants are largely, and in the limiting case completely, bound immediately after their formation by the basic additive material, so that the aggressiveness of the pyrolysis gas and of the water arising is eliminated or, on the other hand, at least considerably reduced In this case, the pH value is in the region around the value 7 and, exactly 7 in the ideal case.

The additive material in most cases is added in a more than stoichiometric ratio, relative to the waste material, that is to say more additive material is added than is theoretically required for binding the pollutants. This is necessary for reliable binding of these pollutants. The quantity of additive material required for binding the pollutants, depends on the composition of the waste material and is determined by calculation based on the constituents of the waste material, or experimentally. Since the composition of the waste material then frequently changes and/or the pyrolysis conditions, such as the pyrolysis temperature and the mixing of the waste material with the additive material, do not remain constant, especially in long-term operation, it is desirable to detect such changes, so that the addition of the additive material can be adjusted correspondingly. Since the additive material after the reaction increases the quantity of pyrolysis residue, which in most cases cannot be utilized, it is also for this reason that monitoring of the addition of the additive material is necessary, in order to avoid unnecessary over-additions.

SUMMARY OF THE INVENTION

It is accordingly an object of the invention to provide a process for the treatment of waste material, which overcomes the hereinafore-mentioned disadvantages of the heretofore-known methods of this general type and which does so in such a way that changes in the pollutant binding are automatically detected and countermeasuers, in particular adjustments of the addition of additive material, are initiated automatically. Furthermore, the process should be easy to carry out without great effort and should not be prone to faults.

With the foregoing and other objects in view there is provided, in accordance with the invention, a process for the treatment of hydrocarbon-containing and especially plastic-containing waste material, which comprises subJecting waste material to pyrolysis with the addition of an additive material binding acidic pollutants, feeding pyrolysis gas formed during pyrolysis to at least one first precooling stage, feeding the pyrolysis gas to at least one second cooling stage downstream of the at least one first precooling stage in gas flow direction, cooling the at least one second cooling stage to a temperature below the condensation temperature of water vapor for obtaining low-boiling pyrolysis oil, diverting part of the low-boiling pyrolysis oil, mixing a solubilizer, preferably acetone, and water to the diverted part of the low-boiling pyrolysis oil, measuring the pH value (H+ ion concentration) of the mixture, automatically reducing the addition of additive material upon a rise in pH value, and automatically increasing the addition of additive material upon a fall in pH value.

Since the low-boiling pyrolysis oil and the water vapor which may be present in the pyrolysis gas are condensed in the second cooling stage downstream of the at least one first cooling stage on the gas side, the low-boiling pyrolysis oil and water arising in the further cooling stage are largely free of soot and/or dirt materials. In fact, these soot or dirt materials are retained in the first cooling stage, where high-boiling pyrolysis oil is obtained by cooling, but not the acidic gaseous constituents of the pyrolysis gas, which arise only in the second cooling stage in the water fraction together with the low-boiling pyrolysis oil. This mixture of low-boiling pyrolysis oil and liquid is chemically neutral, that is to say it has the pH value 7, if the gaseous acidic constituents, in particular the hydrogen halides, formed in the pyrolysis are exactly neutralized as a result of the addition of the basic additive material. If too little additive material is fed in, so that not all of the acidic pollutants are neutralized and an acid excess is present, this manifests itself in the further cooling stage by a corresponding change in the pH value of the mixture of low-boiling pyrolysis oil and water, that is to say the pH value falls below the value 7 in that stage. If, however, more basic additive material is added during the pyrolysis than is required for binding the pollutants, the pyrolysis proceeds in a basic atmosphere and, correspondingly, the pH value in the further cooling stage rises above the value 7.

In order then to be able to me the pH value in the further cooling stage, a sample is taken from the low-boiling pyrolysis oil, which contains pollutant-laden water, and blended with the solubilizer/water mixture Since, in principle, the pH value cannot be measured in an organic liquid, especially in low-boiling pyrolysis oil, the addition of the solubilizer/water mixture is necessary, wherein both the low-boiling pyrolysis oil and the pollutant-laden water are soluble. This mixture of solubilizer, water, low-boiling pyrolysis oil and pollutant-laden water is then subjected to a measurement of the pH value in a conventional pH-value measuring system, and the result of the measurement is utilized for correcting the addition of the additive material. In this way, it is ensured that even during the pyrolysis process, the gases containing the hydrogen halides being formed are already at least largely neutralized in a simple manner and with low consumption of additive material.

In accordance with another mode of the invention, there is provided a method which comprises using an acetone/water mixture which contains equal parts by volume of acetone and water.

In accordance with a further mode of the invention, there is provided a method which comprises continuously diverting and continuously measuring the part quantity of low-boiling and water-containing pyrolysis oil. As a result, continuous monitoring of the pyrolysis process is established in a simple manner In accordance with an added mode of the invention, there is provided a method which comprises continuously diverting a part quantity of approximately 1-2 or 1-3 liters per hour.

In order to minimize the costs, in accordance with an additional mode of the invention, there is provided a method which comprises admixing only about 15 to 30% of acetone/water mixture or solubilizer, relative to the mass flow, to the part quantity of pyrolysis oil.

In accordance with yet another mode of the invention, there is provided a method which comprises correcting the addition of additive material at intervals of 10 to 60 minutes, preferably 20 to 30 minutes, corresponding to the measured pH value. Thus, control interventions are not carried out continuously, not even if the pH value deviates from the intended nominal value.

In accordance with yet a concomitant feature of the invention, there is provided a method which comprises reducing the additive material when the pH value rises to a value above 9, and increasing the additive material when the pH value falls to a value below 5. The pyrolysis thus proceeds in a pH value range which is between 5 and 9, which does not cause any particular problems with respect to corrosion and which can easily be maintained Other features which are considered as characteristic for the invention are set forth in the appended claims.

Although the invention is illustrated and described herein as embodied in a process for the treatment of waste material, it is nevertheless not intended to be limited to the details shown, since various modifications may be made therein without departing from the spirit of the invention and within the scope and range of equivalents of the claims.

The method of operation of the invention, however, together with additional obJects and advantages thereof will be best understood from the following description of specific embodiments when read in connection with the accompanying drawings.

DESCRIPTION OF THE PREFERRED EMBODIMENTS

Figure 1:
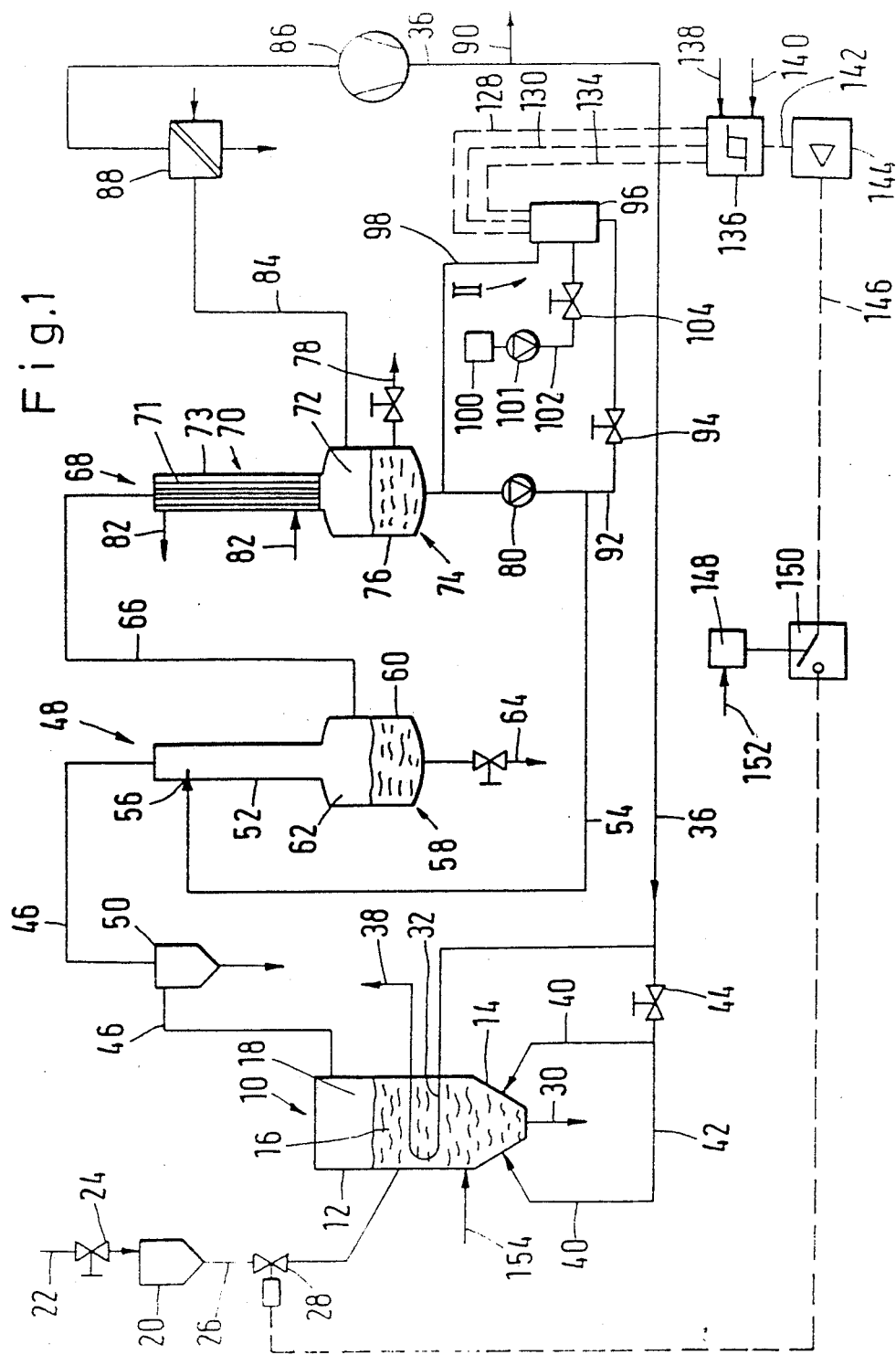
FIG. 1 is a schematic and diagrammatic view of a pyrolysis unit suitable for carrying out the process according to the invention.

Referring now to the figures of the drawing in detail and first, particularly, to FIG. 1 thereof, there is seen a pyrolysis unit which includes an upright pyrolysis reactor 10 with a circular-cylindrical upper region 12 and a tapering circular-conical lower region 14. In the pyrolysis reactor 10, a fluidized bed 16 is formed in such a way that a free gas space remains above the fluidized bed. The height of the gas space is approximately 20 to 30% of the height of the pyrolysis reactor. The fluidizing material used to generate the fluidized bed is fine-grained and appropriately is formed of sand, alumina or the like. The grain size of the fluidizing material is approximately 0.5 mm.

Disposed above the pyrolysis reactor 10 is a storage or stock vessel 20, into which the preferably fine-grained pulverulent additive material is introduced through a pipe 22 with an inserted shut-off element 24 The grain size of the additive material is at most 0.2 mm. The storage vessel 20 is connected with a gradient or slope to the pyrolysis reactor 10 by a pipe 26 with an inserted, remote-controlled shut-off and control element 28, preferably in the form of a motorized valve. The pipe 26 ends in the fluidized bed 16.

A discharge line 30 for the pyrolysis residue is connected to the lower end of the circular-conical region 14 of the pyrolysis reactor 10. A non-illustrated shut-off and control element is inserted into the discharge line At least one gas-fired, hairpin-shaped heater tube 32 is introduced horizontally from the exterior space 34 into the fluidized bed 16 in the upper, circular-cylindrical region 12 of the pyrolysis reactor. In order to provide a gas supply, the heater tube is connected to a pyrolysis gas line 36 which carries the combustible pyrolysis gas generated in the pyrolysis unit. Furthermore, a non-illustrated combustion air feed line and a waste gas line 38 for discharging the waste gas into the exterior space are connected to the heater tube 32.

Several fluidizing gas lines 40 which are connected to a gas line 42 lead into the interior in the lower, circular conical region 14 of the pyrolysis reactor. The gas line 42 is connected to the pyrolysis gas line 36, with the insertion of a shut-off and control element 44. The blow-out direction of the fluidizing gas lines 40 points downwards in the pyrolysis reactor and runs approximately parallel to the wall of the pyrolysis reactor.

A hot-gas line 46 leads from the gas space 18 of the pyrolysis reactor to a first precooling stage 48, with a cyclone separator 50 being inserted into the hot-gas line.

The precooling stage 48 is equipped for direct cooling of the pyrolysis gas. Accordingly, it has a vertically extending, cylindrical heat exchange channel 52, to the upper end of which the hot-gas line 46 is connected A coolant line 54 is likewise connected to the upper end of the heat exchange channel 52. In this case the coolant line is provided with a nozzle 56, by means of which the coolant is sprayed horizontally or vertically downwards into the heat exchange channel 52 The lower end of the heat exchange channel leads into a cylindrical first separator vessel 58, the lower region of which serves as an oil space 60 and the upper region of which serves as a gas space 62. The oil space 60 is also provided with a line 64 which can be shut off.

A connecting line 66 leads from the gas space 62 of the first separator vessel to a second cooling stage 68. The further cooling stage 68 operates with indirect cooling and has a vertical tube heat exchanger 70. The connecting line 66 is connected to the upper ends of vertical exchange tubes 71. The lower ends of the heat exchange tubes lead into a gas space 72 which is formed in a cylindrical second separator vessel 74 above a light oil space 76. A line 78 provided with a shut-off valve as well, as the coolant line 54 with an inserted pump 80, are connected to the second separator vessel 74 at the light oil space 76. The vertical tube heat exchanger 70 is also provided with lines 82, through which cooling water is fed and discharged. The multiplicity of vertical heat exchange tubes 71 of the vertical tube heat exchanger 70 are disposed in a closed cylindrical vessel 73. The gas to be cooled flows downward in the heat exchange tubes, and the cooling water flows upwards in the vessel 73.

The gas space 72 of the second separator vessel 74 is connected through a pipe 84 to the suction side of a gas conveyor 86, which is preferably constructed as a compressor. Advantageously, a further cooler 88, in which the pyrolysis gas is further cooled in indirect heat exchange, is inserted into the line 84. The coolant used is preferably cooling water. The further cooler 88 is only indicated diagrammatically in the drawing. In practice, it is appropriate to construct the further cooler 88 exactly in the same way as the further cooling stage 68. In this case, the condensate which arises on cooling and is formed of oil, is precipitated in a precipitation vessel. It is also advantageous to insert a non-illustrated gas scrubber into the line 84.

The outlet of the gas conveyor 86 is connected to the pyrolysis gas line 36. As already described above, the to the pyrolysis gas line 36. Furthermore, a line 90 through which excess pyrolysis gas s taken off and advantageously used as fuel gas for space heating, is connected to the pyrolysis gas line 36.

On the delivery side of the pump 80, a withdrawal or take-off line 92 with an inserted control and shut-off element 94 is connected to the coolant line 54. The internal width of the withdrawal line 92 is small as compared with the internal width of the coolant line 54. The withdrawal line 92 leads to a pH value measuring instrument 96 and is connected to the bottom of a measuring chamber thereof, to be described in more detail later with respect to FIG. 2. A return flow line 98 leads from the upper end of the measuring chamber back to the suction side of the pump 80 leading to the coolant line 54. The internal width of the return flow line 98 is approximately equal to the internal width of the withdrawal line 92 In the vicinity of the pH value measuring instrument 96, a preferably cylindrical, upright vessel 100 is provided for receiving a water/solubilizer mixture. The lower end of the vessel 100 is connected through a pipe 102, with an inserted control and shut-off element 104, to the pH value measuring instrument.

The pipe 102 leads into the lower region of the measurement chamber in the pH value measuring instrument. In addition, a pump 101 is inserted into the pipe 102 between the vessel 100 and the control and shut-off element 104.

Figure 2:
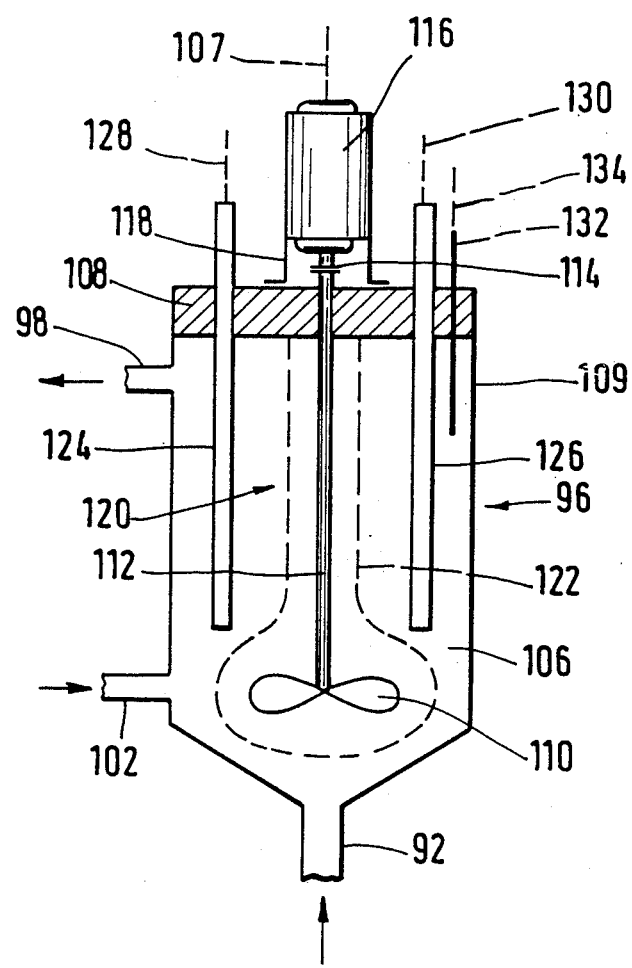
FIG. 2 is an enlarged, fragmentary, vertical longitudinal-sectional view of a portion II of FIG. 1.

In FIG. 2, the pH value measuring instrument 96 is shown in a fragmentary vertical central section on a larger scale. The withdrawal line 92 leads approximately centrally into the lower end of a measurement chamber 106. In addition, the lateral connection of the return flow line 98 in the upper region of the measurement chamber 106 and the lateral, lower connection of the pipe 102 can be seen The measurement chamber 106 has an upright vessel 109 and a cylindrical shape and is closed at the top by a removable cover 108.

In the region where the pipe 102 and the withdrawal line 92 lead into the measurement chamber 106. The stirrer 110 is fixed 110 having approximately the shape of a propeller is provided in the measurement chamber 106. The stirrer 110 is fixed to the lower end of a vertical drive shaft 112 which extends approximately in the region of the vertical axis 107 of the measurement chamber 106. The upper end region of the drive shaft 112 penetrates the cover 108 with a seal and is coupled to the drive shaft of an uptight electric motor 116 by means of a coupling 114. The electric motor 116 is fixed to the cover 108 by means of several feet 118. As can also be seen from FIG. 2, the stirrer 110 and the drive shaft 112 are surrounded in the measurement chamber 106 by an envelope 120, the wall 122 of which is disposed at a distance from the stirrer 110 and from the drive shaft 112. The wall 122 of the envelope is in the form of a screen. The result of providing the envelope 120 is that in the case of a fracture of the stirrer 110, parts flung away are captured and thus do not cause damage to measuring electrodes of the pH value measuring instrument, to be described in more detail below. On the other hand, the effect of the screen construction is that the function of the stirrer 110, namely thorough mixing of the liquids present in the measuring chamber 106, is not impaired.

Two rod-shaped electrodes 124, 126 are introduced through the cover 108 approximately diametrically into the measuring chamber laterally of the envelope 120. These electrodes approximately follow the direction of the vertical axis 107. One of these electrodes is a measuring electrode 124 and the other electrode is a reference electrode 126. The two electrodes 124, 126 pass through the cover 108 to the outside and are respectively connected to an electrical measuring line 128 and an electrical reference line 130. The two electrodes form a measured value sensor, which emits an electric voltage that is proportional to the hydrogen ion concentration, that is to say to the pH value. Apparatus or instruments for pH value determination and their electrodes are known from the state of the art and are briefly described, for example, in "Meyers Lexikon der Technik und der exakten Naturwissenschaften [Meyer's dictionary of Technology and Exact Natural Sciences]" 1970, third volume, pages 1976/77. A temperature sensor 132 which is in the form of a resistance thermometer or a thermocouple also dips into the measurement chamber 106. The temperature sensor 132 in this case also penetrates the cover 108 of the pH value measuring instrument and ends in the upper region of the measurement chamber 106. In order to take off or read the measured temperature value, the temperature sensor is provided with an electric temperature measurement line 134.

As can be seen from FIG. 1, the measurement line 128, the reference line 130 and the temperature measurement line 134 lead to an electric threshold element 136 with hysteresis. The threshold element has a first adjuster 138 for the upper limit of the pH value and a second adjuster 140 for the lower limit of the pH value. In the present illustrative example, a pH value of 9 is set on the first adjuster 138, and a pH value of 5 is set on the second adjuster 140.

The output of the threshold element 136 is connected by an electric lead 142 to the inlet of an electric amplifier 144. An electric lead 146 which leads to the remotely-controlled shut-off and control element 28 is connected to the output of the amplifier 144. A controllable switch 150 which is actuated by a timer 148, is inserted into the electric lead 146 in the illustrated embodiment. The timer 148 is connected to an adjuster 152 which allows the setting of time intervals, during which the switch 150 is closed by the timer 148, preferably for a short period The time during which the switch 150 is held in the closed state by the timer 148, is about 2 to 8 minutes. For the remainder of the time, the switch 150 remains open.

It is also to be noted that the temperature detected by the temperature measurement sensor 132 in the measurement chamber 106 is fed into the threshold element 136 through the temperature measurement line 134. Since the pH value measured by the pH value measuring instrument 96 depends on the temperature of the medium present in the measurement chamber 106, this measure is necessary and effects compensation for the influence of the temperature.

Before the unit is put into operation, an upper limit of the pH value which is not to be exceeded is set on the first adjuster 138. In the present example, this is the value 9. Correspondingly, the lower limit of the pH value, below which the latter must not fall, is set on the second adjuster 140. In the present case, this is the value 5.

The timer 148 is programmed by the adjuster 152 in such a way that the switch 150 regularly closes at intervals of preferably 20 to 30 minutes. The switch 150 must in this case remains closed each time for 2 to 8 minutes and then be opened again by the timer 148. This procedure is repeated regularly.

During operation, the fluidizing material, preferably sand, which is introduced into the pyrolysis reactor, is fluidized by means of pyrolysis gas, so that the fluidized bed 16 is formed. The pyrolysis gas in this case is fed through the fluidizing gas lines 40 and the gas line 42 from the pyrolysis gas line 36. Thus, pyrolysis gas which is brought by the gas conveyor 86 to a gauge pressure of 3 to 6 bar, is used as the fluidizing gas. In this case, the flow of the fluidizing gas is adjusted to the required level by the shut-off and control element 44. In order to heat the fluidized bed, pyrolysis gas is likewise fed from the pyrolysis gas line 36 to the heater tube 32 and burned by means of air. The waste gases flow out through the waste gas line 38, preferably into a non-illustrated stack. Advantageously, a plurality of heater tubes 32 are provided. The fluidized bed 16 is heated by the heater tube 32 to the intended minimum temperature of 500 to 700° Celsius At the same time, the waste material is introduced into the fluidized bed 16 in the direction of the arrow 154 by means of non-illustrated feeder devices, advantageously conveyor screws. The waste material is appropriately or advantageously formed of organic waste material, in particular plastic wastes. The waste material, which is broken up into small pieces before the pyrolysis if necessary, is heated in the fluidized bed 16 to a minimum temperature of 500 to 700° Celsius, or higher.

The waste material in this case is thermally decomposed with the formation of pyrolysis gas, the moisture content in the waste material being partly expelled in the form of gas and becoming a constituent of the pyrolysis gas. In addition, new water molecules are formed during the decomposition of the waste material, depending on its nature, and these also mix with the pyrolysis gas.

Since acidic, gaseous pollutants are formed during the pyrolysis, a basic, preferably pulverulent additive material is introduced into the fluidized bed 16. This is effected by means of the pipe 26, which takes this additive material from the storage vessel 20. This additive material, which is formed of the substances mentioned at the outset, is filled into the storage vessel 20 beforehand through the pipe 22 with the inserted shut-off element 24.

The inflow of the additive material from the storage vessel 20 to the fluidized bed 16 in this case is controlled by the remotely-controlled shut-off and control element 28 which is located in the pipe 26. This shut-off and control element 28 receives opening and closing pulses through the electric lead 146, which passes through the controllable switch 150 to the amplifier 144.

The pyrolysis gas collects in the gas space 18 and is fed by means of the hot-gas line 46 through the cyclone separator 50, in which solids carried over are precipitated, at a temperature of about 400 to 800° Celsius to the precooling stage 48, which operates with direct cooling. The hot pyrolysis gas in this case enters the heat exchange channel 52 and flows downwards to the first separator vessel 58. In order to cool the hot pyrolysis gas, cold low-boiling pyrolysis oil is taken from the second separator vessel 74 and fed by the pump 80 to the heat exchange channel 52. The cooling is effected by spraying the low-boiling pyrolysis oil through the nozzle 56 into the heat exchange channel 52, where it causes partial condensation of the pyrolysis gas. In the heat exchange channel 52, the mixture of condensed high-boiling pyrolysis oil and gaseous components flows downwards to the first separator vessel 58. The high-boiling pyrolysis oil (boiling point higher than 230° C. at atmospheric pressure) collects in the oil space 60 of the first separator vessel 58 and is withdrawn through the line 64 with an inserted shut-off element. Above the oil space 60, the precooled and uncondensed pyrolysis gas collects in the gas space 62. The temperature of the precooled pyrolysis gas is referred to as the precooling temperature. In the present illustrative example, this should be about 180° Celsius. Usually, it is in a range from 150 to 230° Celsius. The high-boiling pyrolysis oil present in the oil space 60 is approximately at the same temperature. During the cooling process in the heat exchange channel 52, soot and dirt particles carried over by the pyrolysis gas are washed out, they are taken up by the high-boiling pyrolysis oil and are present in the pyrolysis oil of the oil space 60. That part of the pyrolysis gas which does not condense in the precooling stage is therefore largely free of soot and/or dirt particles.

The uncondensed pyrolysis gas collecting in the gas space 62 flows through the connecting line 66 to the further cooling stage 68, which operates with indirect cooling. In this case, the pyrolysis gas flows downward, with cooling in the vertical heat exchange tubes 71 of the vertical tube heat exchanger 70, to the second separator vessel 74. Cooling in this case is effected by cooling water which flows in and out through the lines 82. During cooling of the pyrolysis gas, a low-boiling pyrolysis oil (boiling point less than 100° Celsius) is formed in the further cooling stage 68 and collects at the bottom in the second separator vessel 74, that is to say in the light oil space 76 of the second separator vessel 74. The pyrolysis gas collects in the gas space 62 located thereabove. In addition to the coolant line 54, a line 78 with an inserted shut-off valve, through which the excess of low-boiling pyrolysis oil is withdrawn, is also connected to the light oil space 76. The pyrolysis gas is withdrawn from the gas space 72 through the line 84 and passed through the cooler 88 to the gas conveyor 86, which is advantageously constructed as a compressor or blower. The gas conveyor 86 forces the pyrolysis gas into the pyrolysis gas line 36. The heater tube 32 and the fluidizing gas lines 40 are supplied with pyrolysis gas from the pyrolysis gas line 36. In the gas space 72, the pyrolysis gas is at a temperature of about 30 to 60° Celsius. Downstream of the cooler 88, the temperature of the pyrolysis gas is about 10 to 20° Celsius, and it is free of condensable constituents The excess pyrolysis gas which is not required for supplying the unit, is withdrawn from the unit through the pipe 90 and is passed on to further use, for example as fuel gas for heating installations.

Since cooling of the pyrolysis gas in the precooling stage 48 takes place at approximately atmospheric pressure to a temperature higher than 150° Celsius, no water forms there; rather, this remains gaseous and condenses only in the further cooling stage 68, the end temperature of which is below the condensation temperature of the water vapor and which likewise operates at approximately atmospheric pressure. The low-boiling pyrolysis oil collecting in the light oil space 76 therefore also contains a proportion of water.

A partial stream is removed on the delivery side of the pump 80 from the water-containing low-bowling pyrolysis oil, which flows from the further cooling stage 68 through the coolant line 54 to the precooling stage 48 and is introduced through the withdrawal line 92 into the measurement chamber 106 of the pH measuring instrument 96, shown in FIG. 2. The flow of the low-boiling pyrolysis oil in this case is adJusted to a value of 1 to 3 liters per hour by means of the control and shut-off element 94. After flowing through the measurement chamber 106, the low-boiling pyrolysis oil flows through the return flow line 98 to the suction side of the pump 80 and, for this purpose, reaches the connecting line between the light oil space 76 and the pump 80.

Since the control and shut-off element 104 is open, the water/solubilizer mixture stored in the vessel 100 flows into the measurement chamber 106. The mass flow of the solubilizer in this case is approximately 20 to 30% of the mass flow of light pyrolysis oil which flows in the withdrawal line 92 to the measurement chamber 106.

The electric motor 116 is supplied with current by non-illustrated electric leads, so that it is in operation and drives the stirrer 110. This stirrer 110 effects intimate mixing of light pyrolysis oil flowing in and water/solubilizer mixture flowing in. This mixture is subjected to a pH value measurement by means of the electrodes 124 and 126, the temperature of the mixture being detected at the same time by the temperature sensor 132

An electric voltage, which depends on the pH value of the liquid in the measurement chamber 106, is emitted by the two electrodes 124 and 126 through the electric measurement line 128 and the electric reference line 130 to the electric threshold element 136. If the measured pH value exceeds the amount of the upper limit of the pH value preselected on the adjuster 138, preferably the value 9, a closing pulse is passed on through the electric lead 142 to the amplifier 144 and amplified therein. The amplifier passes this closing pulse through the electric lead 146 to the remote-operated control and shutoff element 28, which then restricts or, if necessary, shuts off the feed of basic additive material to the fluidized bed 16. The pH value then drops.

Since the controllable switch 150 is inserted into the electric lead 146, the remotely-controlled control and shut-off element 28 can be actuated by the amplifier 144 only if the switch 150 is closed. Closing of this switch is initiated by the timer 148. The timer 148 is then programmed by the adjuster 152 in such a way that the switch 150 is closed at intervals of appropriately 20 to 30 minutes. The closed state then lasts about 2 to 8 minutes, and the switch 150 is then opened again by the timer 148 for regular repetition of the procedure described above. As can be seen from what has been described above, the remotely-controlled control and shut-off element 28 is actuated only at intervals of preferably 20 to 30 minutes, depending on the measured pH value. This is fully sufficient, since the composition of the waste material in most cases does not change suddenly. Furthermore, this measure avoids undesired oscillations or fluctuations in the feed of additive material to the fluidized bed 16.

If the pH value in the measurement chamber 96 then falls and, in the present example, goes below pH value 5, which is set on the second adjuster 140, an opening command is transmitted by the threshold element 136 to the amplifier 144, is amplified there and transmitted through the electric lead 146 and the controllable switch 150 to the remotely-controlled shut-off and control element 28. The latter then increases the feed of additive material to the fluidized bed 16, if the switch 150 has closed as described above. As a result of the reduced feed of basic additive material, the pH value then rises.

If the measured pH value is in the range between the values 5 and 9, especially at the value 7, neither an opening command nor a closing command is transmitted to the amplifier since, in this case, the feed of additive material takes place at the correct rate for binding the pollutants.

The pH value of the mixture of low-boiling pyrolysis oil and water in the second separator vessel is kept within the limits between the pH values 5 and 9 in the manner described above. If required, these limits can be changed by other settings of the first and second adjusters 138 and 140.

In most cases, the low-boiling pyrolysis oil contains compounds of a type which are poorly miscible with water. In order to ensure that the acidic components arising in this case are detected by the pH value measurement, the solubilizer is used. The solubilizer is readily miscible with water and with the organic and the inorganic, aqueous components of the low-boiling pyrolysis oil, so that a homogeneous mixture is formed, which allows the overall pH value of the low-boiling pyrolysis oil to be measured.

I claim:

1. Process for the treatment of hydrocarbon-containing waste material, which comprises subjecting the waste material to pyrolysis with the addition of an additive material binding acidic pollutants, feeding pyrolysis gas formed during pyrolysis to at least one first precooling stage, feeding the pyrolysis gas to at least one second cooling stage downstream of the at least one first precooling stage in gas flow direction, cooling the at least one second cooling stage to a temperature below the condensation temperature of water vapor for obtaining low-boiling pyrolysis oil, mixing a solubilizer and water with the diverted part of the low-boiling pyrolysis oil, measuring the pH value of the mixture, comparing the measured pH value of the mixture with a predetermined pH range, correcting the addition of the additive material by automatically reducing the addition of additive material upon a rise in pH value outside the predetermined pH range, and automatically increasing the addition of additive material upon a fall in pH value outside the predetermined pH range.

2. Process according to claim 1, which comprises including plastics in the waste material.

3. Process according to claim 1, which comprises adding acetone to the water as the solubilizer.

4. Process according to claim 1, which comprises measuring the H+ ion concentration for measurement of the pH value.

5. Process according to claim 1, which comprises adding acetone to the water as the solubilizer to form a mixture of equal parts of acetone and water.

6. Process according to claim 1, which comprises continuously diverting and continuously measuring the part of the low-boiling pyrolysis oil.

7. Process according to claim 1, which comprises diverting the part of the low-boiling pyrolysis oil at a rate of approximately 1 to 3 liters per hour.

8. Process according to claim 1, which comprises admixing 15 to 30% of solubilizer, relative to the mass flow of the diverted part of the low-boiling pyrolysis oil, with the part of the low-boiling pyrolysis oil.

9. Process according to claim 1, which comprises correcting the addition of the additive material at intervals of 15 to 60 minutes.

10. Process according to claim 1, which comprises correcting the addition of the additive material at intervals of 20 to 30 minutes.

11. Process according to claim 1, which comprises setting the predetermined pH range to pH values of substantially between 5 and 9.

12. Process according to claim 1, which comprises setting the predetermined pH range to a pH value of substantially 7.

* * * * *